(12) United States Patent
Zólomy et al.

(10) Patent No.: US 12,313,741 B2
(45) Date of Patent: May 27, 2025

(54) HYBRID AoX AND HADM SYSTEM FOR LOW COST AND SIMPLE LOCATION FINDING

(71) Applicant: Silicon Laboratories Inc., Austin, TX (US)

(72) Inventors: Attila Zólomy, Budapest (HU); Terry Lee Dickey, Austin, TX (US); Sauli Johannes Lehtimaki, Nummela (FI); Ádám Süle, Budapest (HU); Joel Kauppo, Helsinki (FI); Mika Tapio Länsirinne, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 519 days.

(21) Appl. No.: 17/892,700

(22) Filed: Aug. 22, 2022

(65) Prior Publication Data
US 2024/0061115 A1  Feb. 22, 2024

(51) Int. Cl.
*G01S 17/10* (2020.01)
*G01S 13/76* (2006.01)
*H04W 64/00* (2009.01)

(52) U.S. Cl.
CPC .............. *G01S 17/10* (2013.01); *G01S 13/76* (2013.01); *H04W 64/00* (2013.01)

(58) Field of Classification Search
CPC ........ G01S 17/10; G01S 13/76; G01S 13/765; G01S 7/006; G01S 5/0257; H04W 64/00; H04W 64/003
See application file for complete search history.

(56) References Cited

U.S. PATENT DOCUMENTS

2022/0182781 A1* 6/2022 Smith ...................... G01S 5/02
2022/0390547 A1* 12/2022 Chuo ..................... G01S 7/006

\* cited by examiner

*Primary Examiner* — Farid Seyedvosoghi
(74) *Attorney, Agent, or Firm* — Nields, Lemack & Frame, LLC

(57) ABSTRACT

A system and method for determine the spatial position of a network device is disclosed. A locator device having an antenna array is used to perform an AoX calculation to find the direction to the network device. The AoX calculation utilizes a plurality of the antennas in the antenna array. The locator device also performs a high accuracy distance measurement (HADM). In certain embodiments, only one antenna in the antenna array is used for the HADM calculation. Using the direction and the distance to the network device, the locator is able to determine the spatial position of the network device. In some embodiments, the antenna array may a rotational symmetry array having a plurality of outer antenna elements and one central antenna element.

19 Claims, 9 Drawing Sheets

HYBRID AoX AND HADM SYSTEM FOR LOW COST AND SIMPLE LOCATION FINDING

FIELD

This disclosure describes systems and methods for determining a location of a wireless device using AoX and HADM methods.

BACKGROUND

There is currently interest in expanding current network protocols to allow the possibility for a network device to determine the distance to another network device. For example, the Bluetooth specification is being modified to include High Accuracy Distance Measurement (HADM). As currently proposed, HADM discloses basic measurement techniques for two-way ranging.

Additionally, the Bluetooth specification also discloses different techniques for measuring the angle of arrival (AoA) or angle of departure (AoD) of a signal associated with another network device.

In addition to determining the direction to a network device or the distance to that network device, there is interest in determining the spatial position of that network device. Currently, there are two common techniques that may be used to determine the spatial position of a network device. Both involve the use of at least 3 locator devices. In both techniques, the locations of the 3 locator devices are known.

According to one approach, all of the locator devices determine their angle of arrival or angle of departure (collectively referred to as AoX) with respect to the network device. The spatial position of the network device can then be triangulated using the locations of the locator devices and the corresponding AoX measurements.

According to the second approach, all of the locator devices determine their distance to the network device. The spatial position of the network device can then be triangulated using the locations of the locator devices and the corresponding distance measurements.

While these techniques are effective in determining the spatial position of a network device, there are some shortcomings. First, these techniques require three locator devices, which involves cost. Secondly, to calculate the spatial position, communication is required between the 3 locators to share the information possessed by each.

Therefore, it would be beneficial if there were a system and method to determine the spatial position of a network device without a plurality of locator devices.

SUMMARY

A system and method for determining the spatial position of a network device is disclosed. A locator device having an antenna array is used to execute an AoX algorithm to find the direction to the network device. The AoX algorithm utilizes signals from a plurality of the antennas in the antenna array. The locator device also performs a high accuracy distance measurement (HADM). In certain embodiments, only one antenna in the antenna array is used for the HADM calculation. Using the direction and the distance to the network device, the locator is able to determine the spatial position of the network device. In some embodiments, the antenna array may be a rotational symmetry array having a plurality of outer antenna elements and one central antenna element.

According to one embodiment, a method of determining the spatial position of a network device, using a locator device having a known position is disclosed. The locator device has an antenna array. The method comprises calculating a direction from the locator device to the network device using an AoX algorithm, wherein signals from a plurality of antenna elements in the antenna array are used as inputs to the AoX algorithm; calculating a distance from the locator device to the network device using an HADM algorithm, wherein signals from only one antenna element in the antenna array are used as inputs by the HADM algorithm; and determining the spatial position of the network device using the known position, the direction and the distance. In some embodiments, each antenna element in the antenna array generates two polarization signals, and calculating the direction comprises: using at least one of the two polarization signals from each antenna element in the plurality of antenna elements as the inputs to the AoX algorithm. In some embodiments, the two polarization signals from the only one antenna element are combined to form a circularly polarized signal and the circularly polarized signal is used to set a gain of a receive circuit in the locator device before the AoX algorithm is executed. In some embodiments, the only one antenna element generates two polarization signals which are combined to form a circularly polarized signal and the circularly polarized signal is used as an input by the HADM algorithm. In certain embodiments, the signals from the only one antenna element are not used as inputs by the AoX algorithm. In some embodiments, the antenna array comprises a plurality ($N_a$) of antenna unit cells arranged in an outer ring, each antenna unit cell offset from an adjacent antenna unit cell by an angle equal to $360°/N_a$, wherein each antenna unit cell comprises: a top surface, comprising a patch antenna and a ground guard ring surrounding the patch antenna; and a ground layer disposed beneath the top surface; and a central antenna disposed inside the outer ring. In certain embodiments, the plurality of antenna unit cells in the outer ring comprise the plurality of antenna elements used by the AoX algorithm. In certain embodiments, signals from only the central antenna are used by the HADM algorithm. In certain embodiments, the central antenna generates two polarization signals which are combined to form a circularly polarized signal and the circularly polarized signal from the central antenna is used as an input by the HADM algorithm. In some embodiments, the antenna array comprises a plurality of antenna unit cells arranged in a two dimensional array; wherein signals from all antenna unit cells in the plurality of antenna unit cells are used as inputs by the AoX algorithm. In certain embodiments, one or more of the plurality of antenna unit cells are surrounded by adjacent antenna unit cells on all sides and are referred to as interior antenna unit cells; and wherein signals from one of the interior antenna unit cells are used as inputs by the HADM algorithm. In some embodiments, the method further comprises using the direction to compensate for phase variation in the only one antenna element in the antenna array prior to performing the HADM algorithm.

According to another embodiment, locator device for determining a spatial position of a network device, wherein the locator device has a known position, is disclosed. The locator device comprises an antenna array, comprising a plurality of antenna elements, each generating one or more signals; a multiplexer in communication with the one or more signals from the plurality of antenna elements; a radio circuit to receive an output from the multiplexer; a processing unit; a memory device in communication with the processing unit, comprising instructions, which when executed by the processing unit, enable the locator device to: calculate a direction from the locator device to the network device using an AoX algorithm, wherein signals from a plurality of antenna elements in the antenna array are used to provide inputs to the AoX algorithm; calculate a distance from the locator device to the network device using an HADM algorithm, wherein signals from only one antenna element in the antenna array are used by the HADM algorithm; and determine the spatial position of the network device using the known position, the direction and the distance.

In some embodiments, the antenna array comprises a plurality ($N_a$) of antenna unit cells arranged in an outer ring, each antenna unit cell offset from an adjacent antenna unit cell by an angle equal to $360°/N_a$, wherein each antenna unit cell comprises: a top surface, comprising a patch antenna and a ground guard ring surrounding the patch antenna, the patch antenna having one or more vias to generate the one or more signals; and a ground layer disposed beneath the top surface; and a central antenna disposed inside the outer ring, having one or more vias to generate the one or more signals. In some embodiments, the plurality of antenna unit cells in the outer ring comprise the plurality of antenna elements used by the AoX algorithm. In some embodiments, signals from only the central antenna are used by the HADM algorithm. In certain embodiments, the locator device comprises a 90° hybrid, wherein the central antenna generates two polarization signals which are combined by the 90° hybrid to form a circularly polarized signal; and the circularly polarized signal from the central antenna is used by the HADM algorithm. In some embodiments, the antenna array comprises a plurality of antenna unit cells arranged in a two dimensional array; wherein signals from all antenna unit cells in the plurality of antenna unit cells are used as inputs by the AoX algorithm. In certain embodiments, one or more of the plurality of antenna unit cells are surrounded by adjacent antenna unit cells on all sides and are referred to as interior antenna unit cells; and wherein signals from one of the interior antenna unit cells are used as inputs by the HADM algorithm. In certain embodiments, the locator device comprises a 90° hybrid, wherein the one of the interior antenna unit cells generates two polarization signals which are combined by the 90° hybrid to form a circularly polarized signal and the circularly polarized signal is used by the HADM algorithm.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1A:
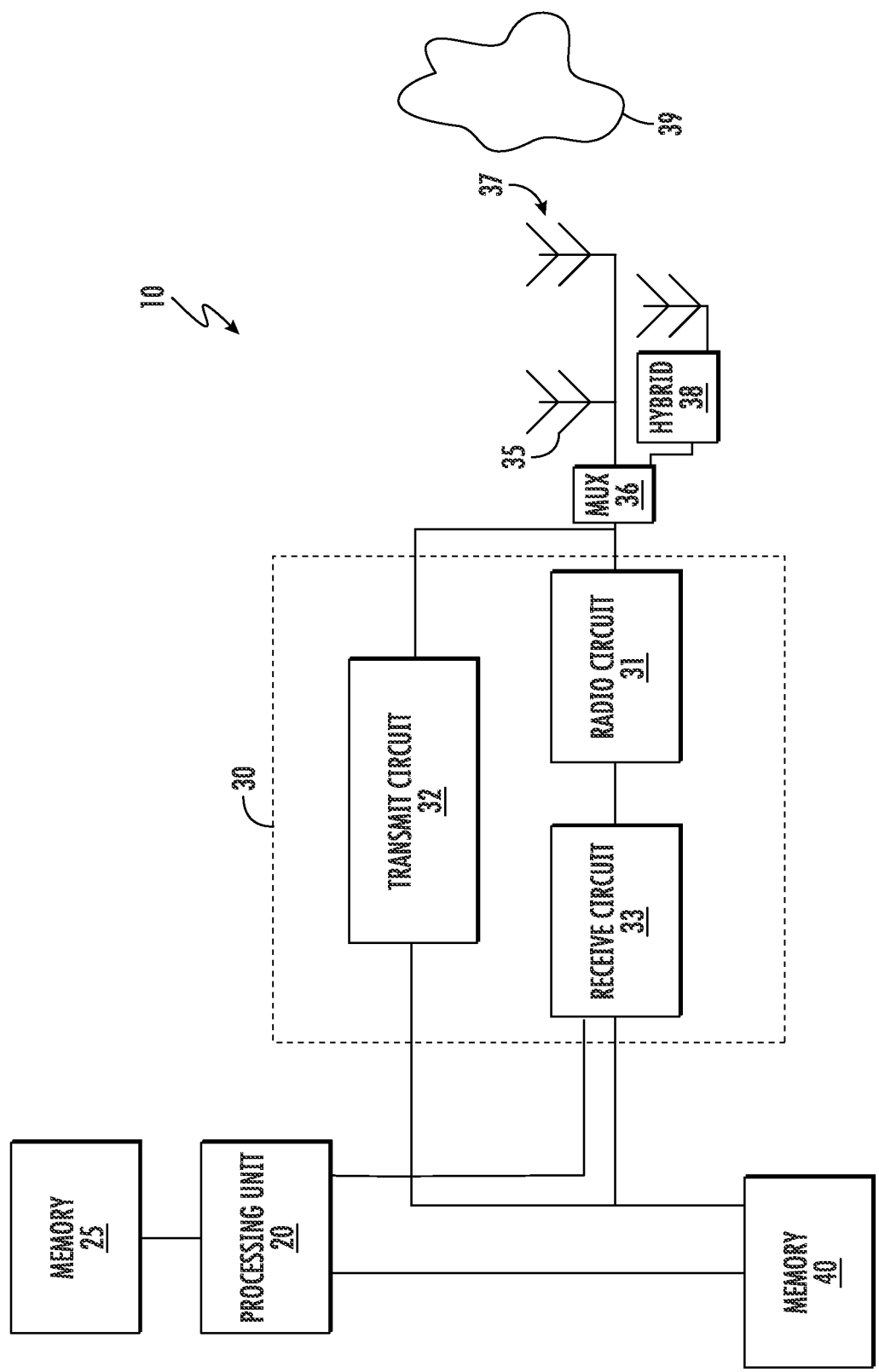
FIG. 1A is a block diagram of a locator device that may be used to perform the method described herein.

FIG. 1A shows a locator device that may be used to perform the spatial positioning algorithm described herein. The locator device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the locator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The locator device 10 also includes a network interface 30, which may be a wireless network interface that includes an antenna array 37 that includes a plurality of antenna elements 35. The network interface 30 may support any wireless network protocol that supports range detection and AoX detection, such as Bluetooth. The network interface 30 is used to allow the locator device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a receive circuit 33. The receive circuit 33 is used to receive, synchronize and decode the digital signals received from the radio circuit 31. Specifically, the receive circuit 33 has a preamble detector that is used to identify the start of an incoming packet. The receive circuit 33 also has a sync detector, which is used to identify a particular sequence of bits that are referred to as a sync character. Additionally, the receive circuit 33 has a decoder which is used to convert the digital signals into properly aligned bytes of data.

The network interface 30 also includes a transmit circuit 32. The transmit circuit 32 may include a power amplifier that is used to supply a signal to be transmitted by one of the antenna elements in the antenna array 37.

The locator device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1A. The second computer readable non-transitory media may be a CDROM, or a different memory device, which is located remote from the locator device 10. The instructions contained on this second computer readable non-transitory media may be downloaded onto the memory device 25 to allow execution of the instructions by the locator device 10.

While the processing unit 20, the memory device 25, the network interface 30 and the second memory device 40 are shown in FIG. 1A as separate components, it is understood that some or all of these components may be integrated into a single electronic component. Rather, FIG. 1A is used to illustrate the functionality of the locator device 10, not its physical configuration.

Although not shown, the locator device 10 also has a power supply, which may be a battery or a connection to a permanent power source, such as a wall outlet.

Figure 1B:
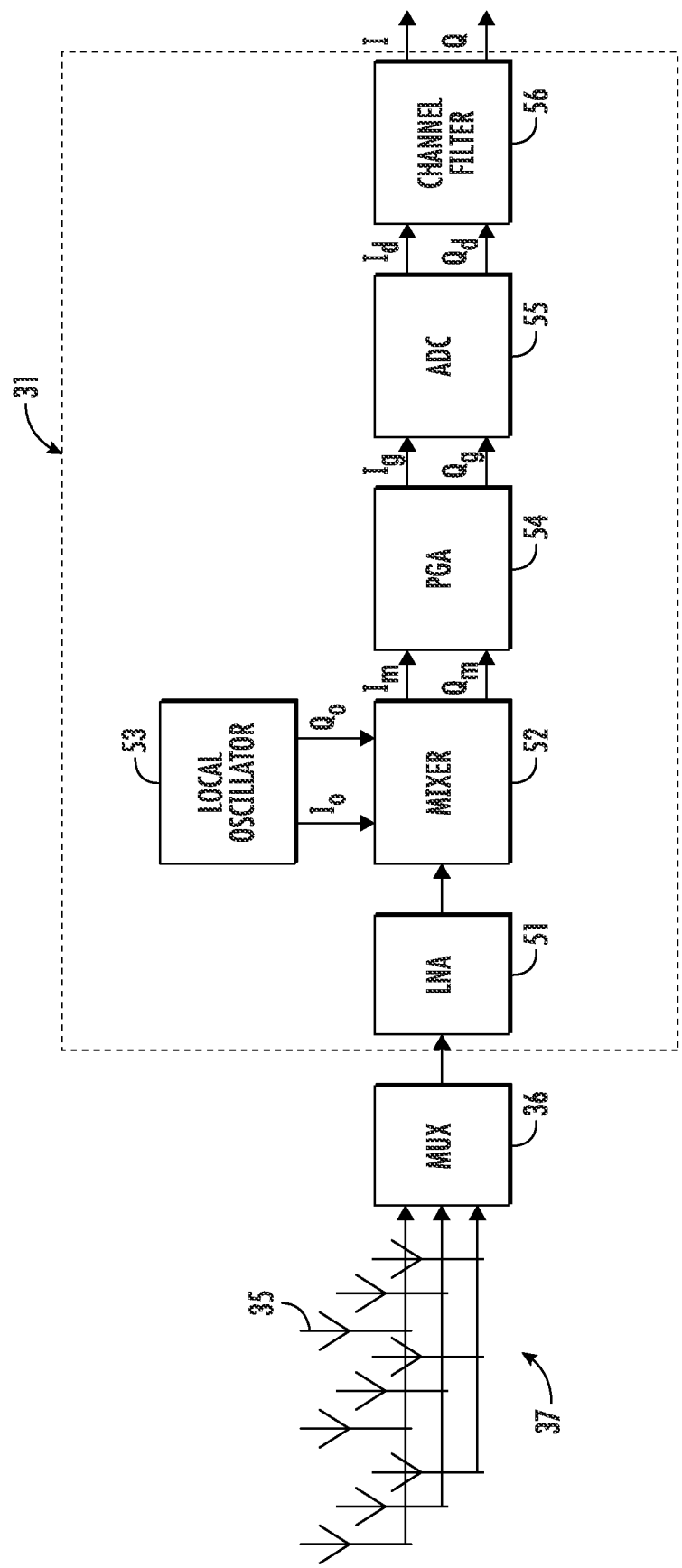
FIG. 1B is a block diagram of the radio receiver of the network device of FIG. 1A.

FIG. 1B shows a block diagram of the radio circuit 31. The wireless signals first enter the radio circuit 31 through one antenna element 35 of the antenna array 37. The multiplexer 36 may be used to select one antenna element 35 from the antenna array 37. Once selected, this antenna element 35 is in electrical communication with a low noise amplifier (LNA) 51. The LNA 51 receives a very weak signal from the antenna element 35 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). The CORDIC may be disposed in the radio circuit 31, or elsewhere within the network interface 30. Of course, other circuits may be used to calculate phase and/or amplitude.

Figure 2A:
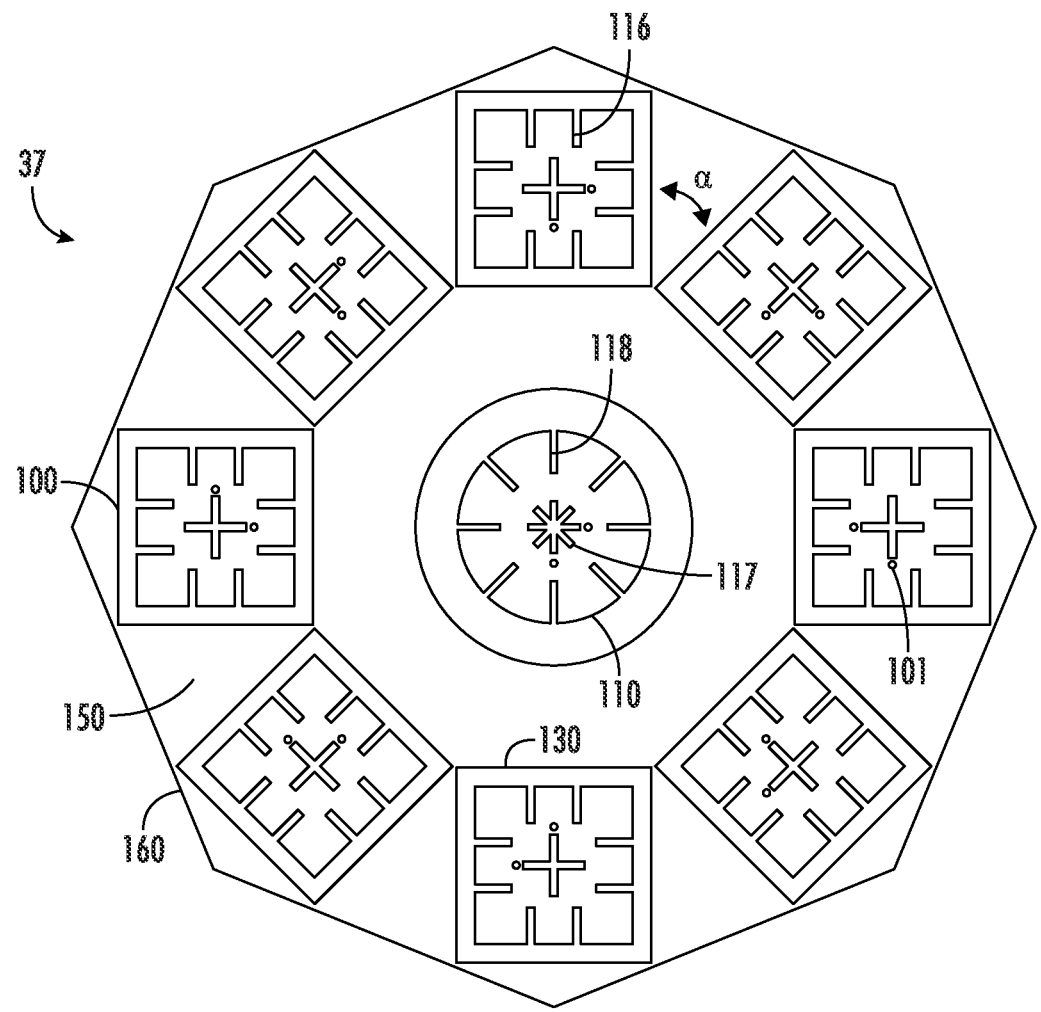
FIGS. 2A-2B show the antenna array according to two different embodiments.

FIG. 2A shows one embodiment of an antenna array 37. In this embodiment, the antenna array 37 is a rotational symmetric antenna array utilizing a plurality of antenna unit cells 100. Each antenna unit cell 100 may comprise a top layer, on which the patch antenna is disposed, and a ground layer disposed beneath the top layer. In some embodiment, a reactive inductance surface (RIS) layer is disposed beneath the top surface and above the ground layer. This RIS layer contains metamaterial structures. The metamaterial structures are configured to present an inductance to the patch antennas, thereby allowing the patch antennas to be smaller than would otherwise be possible. In some embodiments, the metamaterial structures comprise hollow square frames. Each patch antenna may also be in communication with two signal vias 101, which are used to carry signals to and from the patch antenna. The two signals represent two orthogonal polarizations (such as radial and tangential or vertical and horizontal). In some embodiments, each antenna unit cell 100 is surrounded by a ground guard ring 130. The ground guard ring 130 may be electrically connected to the ground layer using stitching vias.

In this embodiment, there are eight antenna unit cells 100 arranged in an outer ring 150, which, in this figure, is an octagon. This is accomplished by offsetting each antenna unit cell 100 from the adjacent antenna unit cell by an angle, α, wherein α is defined as 360° divided by the number ($N_a$) of antenna unit cells used in the outer ring 150. Thus, in this embodiment, α is 45°. Further, the rotational symmetric antenna array also includes a central antenna 110 which is located inside the outer ring 150. In this embodiment, the central antenna 110 includes a central patch antenna having a circular shape. Importantly, the circular shape of the central patch antenna of the central antenna 110 means that each of the antenna unit cells 100 in the outer ring 150 has the same spatial relationship to the central antenna 110.

In certain embodiments, the central antenna 110 may be configured to use a RIS layer, similar to that described above with respect to the antenna unit cells 100. In other embodiments, the central antenna 110 may not utilize metamaterials. For example, the central antenna 110 may comprise only a central patch antenna with signal vias 101 connecting it to signal traces. In some embodiments, the central patch antenna may be on the top surface, as are the patch antennas of the antenna unit cells 100 in the outer ring 150. In another embodiment, the central patch antenna may be disposed on a layer of the printed circuit board that is below the top surface. For example, the central patch antenna may be disposed on an intermediate layer. The antenna unit cells 100 and the central antenna 110 comprise the antenna elements 35 in the antenna array 37.

In certain embodiments, the antenna unit cells 100 are arranged such that the corner of the ground guard ring 130 of one antenna unit cell 100 touches the corner of the ground guard ring 130 of the adjacent antenna unit cell 100 at one point. In other embodiments, the ground guard rings 130 of adjacent antenna unit cells 100 may be separated from each other.

Further, in some embodiments, a ground plane 160 is disposed on the top surface between the central antenna 110 and the outer ring 150 and outside the outer ring 150. The ground guard rings 130 contact the ground plane 160 around the perimeter of each antenna unit cell 100. Further, as noted above, each ground guard ring 130 may contact each of the ground guard ring 130 of the two adjacent antenna unit cells 100 at a point.

In one embodiment, shown in FIG. 2A, the outer perimeter of the ground plane 160 is a polygon having the same number of sides as there are antenna unit cells 100 in the outer ring 150. Thus, in this figure, the outer perimeter of the ground plane 160 forms an octagon. In this embodiment, the sides of outer perimeter of the ground plane 160 are not parallel to the outer edges of each of the antenna unit cells 100 in the outer ring 150. The outer perimeter is defined as the outer edge of the ground plane 160 which is outside the outer ring 150. Rather, the corners of the sides of the outer perimeter of the ground plane 160 are located along a line that extends from the center of the rotational symmetric antenna array and passes through the midpoint of the side of an antenna unit cell 100. In other words, the ground plane 160 is rotated by $180°/N_a$, wherein $N_a$ is the number of antenna unit cells 100 in the outer ring 150. Thus, the outer perimeter is offset by $180°/N_a$ from the polygon formed by the edges of the antenna unit cells 100. In other embodiments, the outer perimeter of the ground plane 160 may be parallel to the outer edges of each antenna unit cell 100. In another embodiment, the outer perimeter of the ground plane 160 may be circular.

Further, the inner perimeter of the ground plane 160 may be circular. The inner perimeter is defined as the inner edge of the ground plane 160 which is disposed between the inside of the outer ring 150 and the central antenna 110. However, in other embodiments, the inner perimeter of the ground plane 160 may also be a polygon having the same number of sides as there are antenna unit cells 100 in the outer ring 150. Alternatively, the inner perimeter of the ground plane 160 may also be rotated such that the sides of the inner perimeter are parallel with the inside edges of the slotted antenna unit cells in the outer ring 150. In other embodiments, the inner perimeter of ground plane 160 may be rotated by $180°/N_a$, wherein $N_a$ is the number of antenna unit cells 100 in the outer ring 150, from the polygon formed by the edges of the antenna unit cells 100.

Figure 2B:
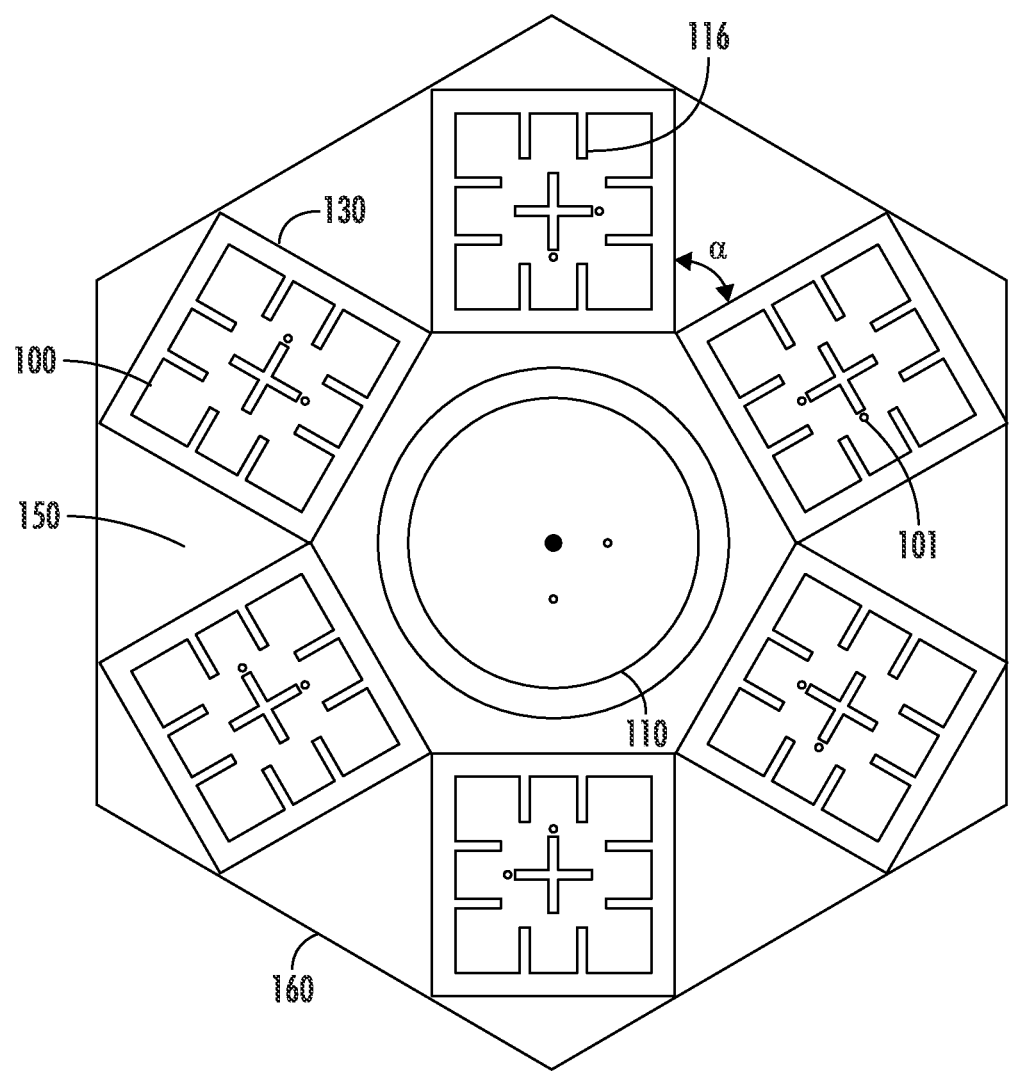

In some embodiments, the patch antennas of the antenna unit cells 100 may be slotted. The slots 116 in the patch antenna of the antenna unit cells 100 may help reduce the size of each antenna unit cell 100, making the rotational symmetric antenna array more compact. In addition, optionally, the central antenna 110 may include a central patch antenna having slots 118 as well. In some embodiments, the number of slots 118 that extend inward from the outer perimeter of the central patch antenna may be equal to the number of antenna unit cells 100 in the outer ring 150. In other embodiments, the number of slots 118 may be an integral multiple of the number of antenna unit cells 100 in the outer ring. Additionally, the central patch antenna for the central antenna 110 may have star-shaped slots 117 at its center. Again, the number of slots in the star shape may be equal to the number of antenna unit cells 100 in the outer ring. While FIG. 2A shows slots in the central patch antenna, it is understood that the central patch antenna may not have slots, as shown in FIG. 2B. As described above, the central patch antenna for the central antenna 110 may be disposed on the top surface or an intermediate layer. Further, the central antenna 110 may or may not utilize metamaterials, as described above.

Thus, the size and configuration of the antenna unit cells 100, the central antenna 110 and the ground plane 160 are not limited by this disclosure.

Although the embodiment in FIG. 2A show eight antenna unit cells 100 in the outer ring 150, the outer ring 150 may include any number of antenna unit cells that is greater than 3. For example, as shown in FIG. 2B, six antenna unit cells 100 may be disposed in the outer ring 150. Because there are a different number of antenna unit cells 100, the angular offset, α, is changed to 60°. Likewise, if there are $N_a$ antenna unit cells 100 in the outer ring 150, the central antenna 110 may be circular or a regular polygon having $N_a$ sides. While FIG. 2B shows the central antenna 110 as lacking slots, it is understood that the central patch antenna may be slotted, as shown in FIG. 2A.

The signal vias 101 for each antenna unit cell 100 may be provided to the input to the multiplexer 36 (see FIG. 1A), where the output of the multiplexer 36 provides the input to the radio circuit 31. Thus, if there are N a antenna unit cells 100 in the outer ring 150, there may be at least $2*N_a$ inputs to the multiplexer 36.

In addition, in some embodiments, the two signal vias 101 from the central antenna are provided to a 90° hybrid 38 to create a circularly polarized signal. This circularly polarized signal may be provided as an input to the multiplexer 36 as well.

Thus, in certain embodiments, through proper selection of the multiplexer 36, the radio circuit 31 may be in communication to one of the two polarizations for one of the antenna unit cells 100 in the outer ring 150, or in communication with the circularly polarized signal from the central antenna 110. In some embodiments, the two polarization signals from the central antenna 110 are also provided as inputs to the multiplexer 36.

As noted above, to determine the spatial position of a network device, it is necessary to determine its direction and its distance from the locator device 10.

The traditional method to measure direction utilizes an AoX algorithm. Angle of Arrival and Angle of Departure algorithms, collectively referred to as AoX algorithms, typically operate by determining a phase difference between different antenna elements 35 in the antenna array 37. This phase difference can be used to determine the angle from which the signal originated, since the distance between antenna elements is known.

Specifically, assume the distance between two adjacent antenna elements is d. The phase difference between when the incoming signal is detected at these two adjacent antennas can be given as φ. This phase difference, φ, divided by 2π, multiplied by the wavelength, λ, represents the distance between the two antenna elements, as viewed from the signal source. Knowing this difference in the distance that the incoming signal travelled allows the angle of arrival to be calculated. Specifically, the angle of arrival can be given by the difference in the distance that the incoming signal travelled, divided by d represents the cosine of the incoming signal. In other words, the angle of arrival is defined as the arc cosine of $(\varphi\lambda/2\pi)/d$.

Thus, for angle of arrival calculations, a signal is transmitted from a network device using a single antenna to a locator device having an antenna array. Conversely, for angle of departure calculations, the locator device transmits a signal, sequentially from each of the antenna elements in the antenna array to a network device having a single antenna.

Figure 3A:
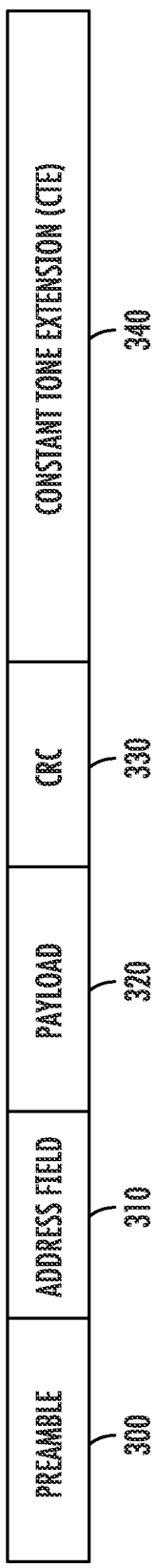
FIG. 3A-3C shows the format of a representative direction detection message transmitted to the system of FIG. 1A.
Figure 3B:
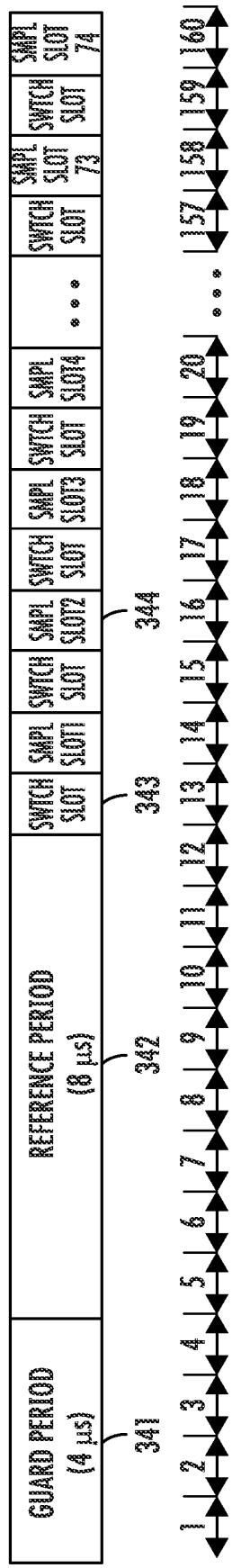
Figure 3C:
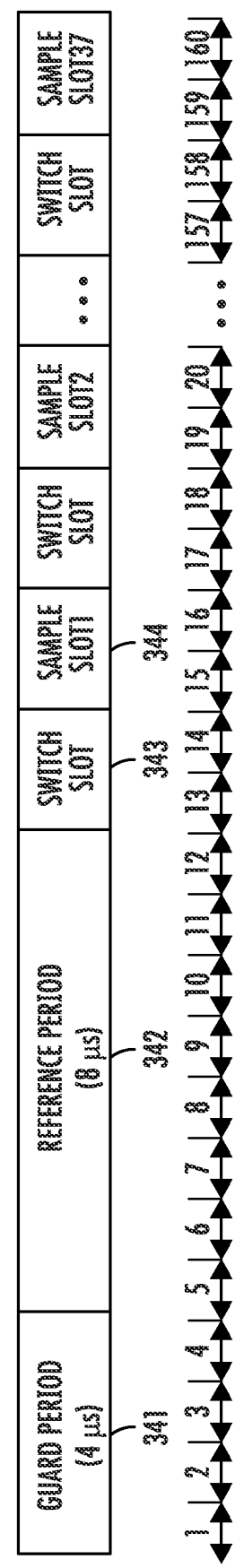

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, the special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"s. The CTE 340 may be as long as 160 μsec and as short as 16 μsec. In practice, the locator device 10 may use a single antenna element 35 of the antenna array 37 to receive the CTE 340 during the guard period 341 and the reference period 342. The device utilizes the signal received during the guard period 341 and the reference period 342 to set the gain (AGC) and frequency (AFC) of the radio circuit 31. The gain and frequency determinations by the radio circuit 31 may be more accurate if a circularly polarized signal from an antenna element 35 is used during the guard period 341 and the reference period 342.

The locator device 10 then switches to another antenna element 35 during each switch slot 343 by changing the selection of the multiplexer 36. The locator device 10 samples the tone again with that new antenna element 35 during the sample slot 344. The locator device 10 continues switching the antenna element 35 during each switch slot 343 and sampling the tone during the sample slot 344. If there are more switch slots 343 than antenna elements, the locator device 10 returns to the first antenna element 35 and repeats the sequence.

During the entirety of the CTE 340, the sending device is transmitting a tone at a constant known frequency. As stated above, the locator device 10 may receive that tone using one antenna element 35 of the antenna array 37. Specifically, the guard period 341 and the reference period 342, which have a combined duration of 12 μsec, may be received using the same antenna element 35.

In some embodiments, it has been found that the accuracy of AoX algorithms is improved when the radio circuit 31 utilizes two polarization signals from each antenna. These two polarization signals may be the horizontal and vertical polarized signals from each antenna in the case of a standard 2 dimensional array. In the case of a rotational symmetric antenna array, like that shown in FIGS. 2A-2B, the two polarization signals may be radial and tangential. Thus, the radio circuit 31 selects each antenna during at least two different sample slots 344; one to receive the first polarized signal, and one to receive the second polarized signal.

Thus, in summary, to optimize the accuracy of the AoX algorithm, it may be beneficial to sample each antenna element 35 during at least two sample slots 344, such that the two different polarization signals from each antenna are used as inputs to the AoX algorithm.

Thus, after receipt of the CTE 340, the locator device 10 may have generated I and Q signals for each polarization of each antenna element 35 in the antenna array 37.

Using these I and Q signals, an indication of the elevation angle and azimuth angle of the incoming signals can be determined. For example, a number of different algorithms, such as MUSIC, may be used to determine the angle of arrival based on the acquired I and Q signals. In addition to the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the angle of arrival. Therefore, throughout this disclosure, any algorithm that accepts signals from a plurality of antenna elements as inputs and based on that, determines an Angle of Arrival or an Angle of Departure, may be referred to as an AoX algorithm.

Additionally, as noted above, to calculate the spatial position of a network device, the distance to the network device must be calculated. There are several ways to calculate distance. One technique relies on measuring the time of flight and the second uses phase to determine distance.

Figure 7:
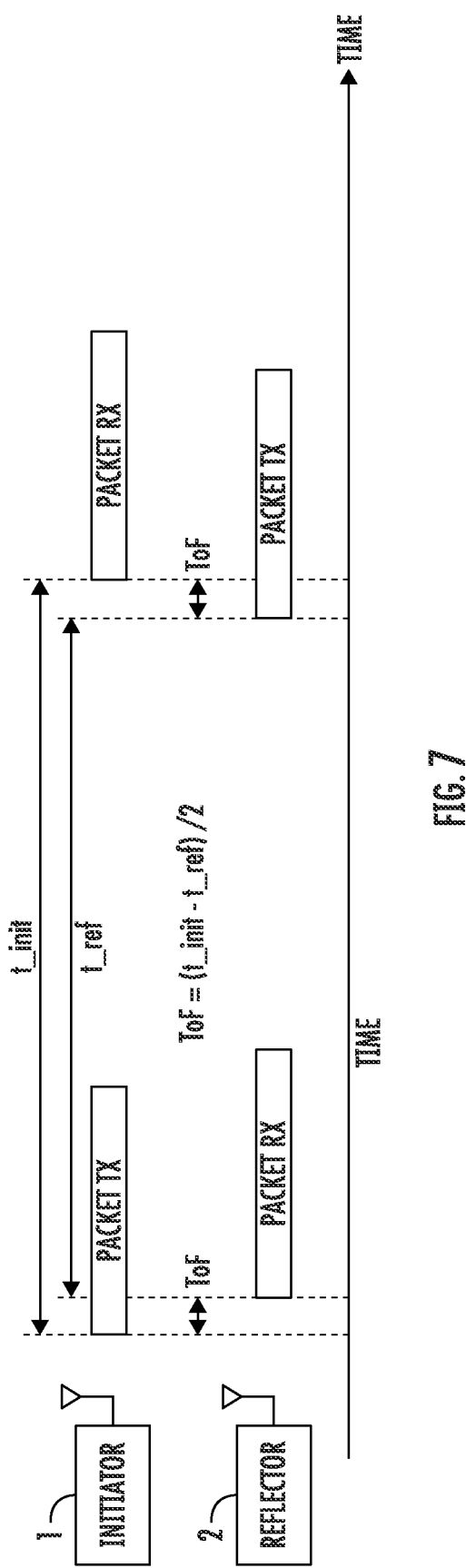
FIG. 7 shows the operation of HADM according to one embodiment that utilizes time of flight.

FIG. 7 shows the operation of HADM according to one embodiment that utilizes time of flight. The horizontal axis represents time. The system includes an initiator 1 and a reflector 2. The initiator 1 transmits a packet to the reflector 2. The initiator 1 starts a timer at the moment that the first bit of the packet reaches the transmit antenna. Some time after the initiator 1 starts transmitting, the reflector 2 begins receiving this packet. The difference between the start of transmission by the initiator 1 and the start of reception by the reflector 2 is the time of flight (ToF). As soon as this packet is detected by the reflector 2, the reflector 2 starts a timer. The reflector 2 then waits a predetermined amount of time and then transmits a packet back to the initiator 1. The reflector 2 stops its timer when the first bit of its packet reaches its transmit antenna. This time is referred to as the reflector time or t_ref in FIG. 7. When the initiator 1 senses the incoming packet from the reflector 2, the initiator 1 stops its timer. This total time is referred to as initiator time or t_init in FIG. 7. Note that both timers are compensated for delays through the respective read and transmit circuits. If the reflector time is subtracted from the initiator time and that difference is divided in half, the time of flight can be determined.

Round trip delay may be measured using two different standard defined signals; Sounding Sequence and Random Bit Sequence. The Sounding Sequence is a predetermined bit pattern having a predetermined frequency, while the Random Bit Sequence is simply a sequence of random bits.

Alternatively, distance may be calculated based on phase. For example, when a signal is transmitted from the locator device 10 to another network device, it may have a frequency, $\omega_I$, and a phase, $\varphi_I$. The clock at the network device used to sample the incoming signal may also have a frequency, $\omega_R$ and a phase, $\varphi_R$. Thus, the phase of the received signal can be expressed as $(\omega_I - \omega_R)t + \varphi_I - \varphi_R + \theta_p$, where $\theta_p$ is the phase delay caused by the propagation through air from the locator device to the network device. Assuming that the frequency offset between the two devices may be determined and eliminated, the resulting phase is given by $\varphi_I - \varphi_R + \theta_p$. Similarly, if the network device transmits a signal to the locator device, it may have a frequency, $\omega_R$ and a phase, $\varphi_R$. The clock at the locator device used to sample the incoming signal may also have a frequency, $\omega_I$ and a phase, $\varphi_I$. Thus, the phase of the received signal can be expressed as $(\omega_R - \omega_I)t + \varphi_R - \varphi_I + \theta_p$. Again, assuming that the frequency offset can be eliminated, the resulting phase is $\varphi_R - \varphi_I + \theta_p$. If these two resulting phases are added together, it can be seen that the roundtrip phase is twice the propagation delay caused by the distance through air. Further, to eliminate phase wraps, it may be useful to perform the same sequence at a second frequency, which is fairly close to the initial frequency. The result can be expressed as:

$$\text{distance} = \frac{C(\theta_{p1} - \theta_{p2})}{2\pi(f_1 - f_2)},$$

wherein $\theta_{p1}$ is the round trip phase at the first frequency (f1) and $\theta_{p2}$ is the round trip phase at the second frequency (f2).

Furthermore, there are more sophisticated HADM algorithms where more than two frequencies are used to mitigate the multipath propagation effects more efficiently.

Additionally, while the above describes two-way HADM algorithms, it is appreciated that one-way HADM algorithms are also possible, and may be used with the locator device 10 described herein.

Therefore, throughout this disclosure, any algorithm that utilizes time of flight or phase to determine the distance to another network device may be referred to as an HADM algorithm.

Figure 4:
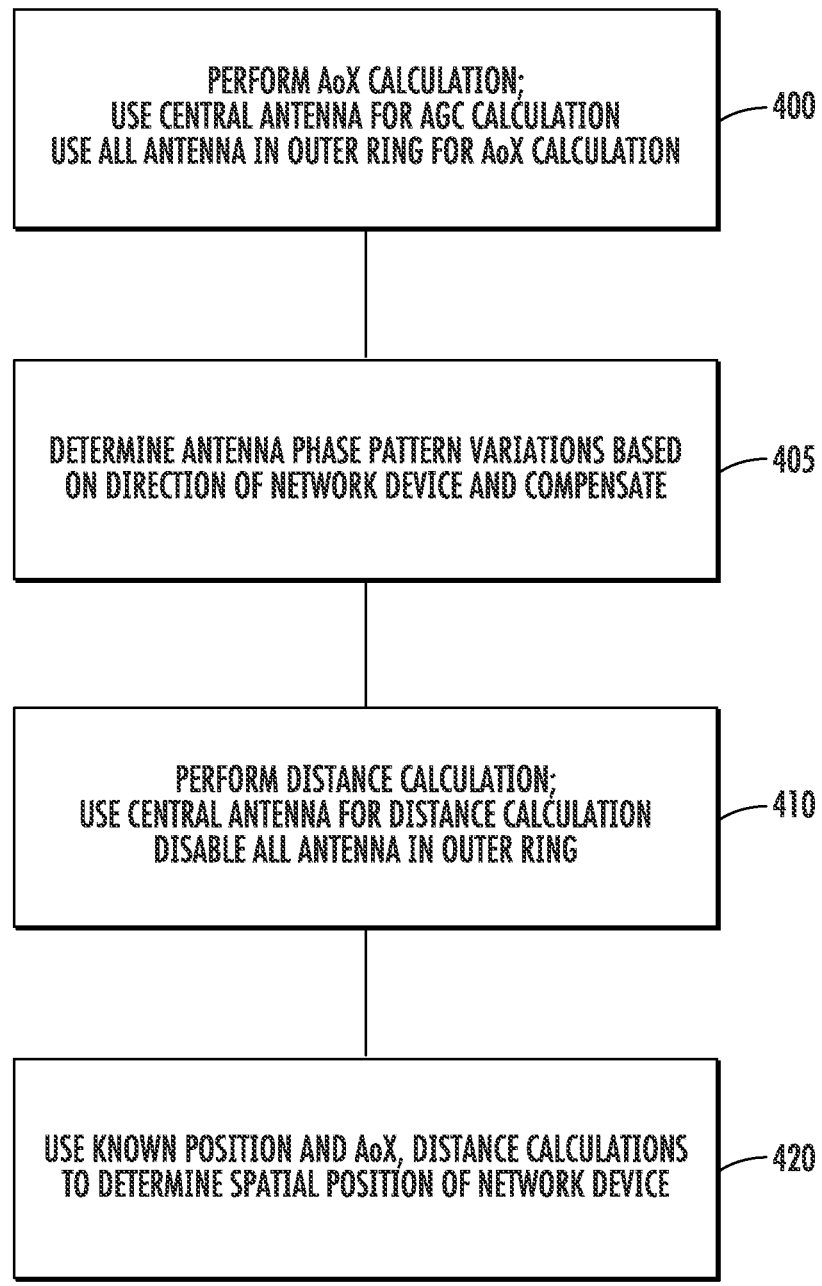
FIG. 4 shows a flow chart for calculating the spatial position of a network device using the antenna array of FIG. 2.

Having described the algorithms used to determine direction and distance, the operation of the locator device 10 will be described with reference to FIG. 4.

First, as shown in Box 400, the locator device 10 is configured to perform the AoX algorithm. In this mode, the locator device 10 may utilize the central antenna 110 to set the automatic gain control (AGC) of the radio circuit 31. For example, the locator device 10 may utilize the central antenna 110 during the guard period 341 and the reference period 342 to set the AGC. During the actual transmission of the packet containing the CTE, the processing unit 20 switches the multiplexer 36 so that samples are collected from each of the antenna unit cells 100 disposed along the outer ring 150. In certain embodiments, the processing unit switches the multiplexer 36 so that samples are collected for both polarizations of each antenna unit cell 100 in the outer ring. Thus, during the AoX algorithm, the processing unit 20 selects the antenna unit cells 100 in the outer ring 150 and does not utilize any signals from the central antenna 110 to determine the angle of arrival or departure. Note that the antenna unit cells 100 in the outer ring 150 are used for both AoA and AoD calculations.

Next, as shown in Box 410, the distance measurement is made using the HADM algorithm. This may be done by selecting the circular polarization signal from the central antenna 110 and using the signal received and transmitted from that central antenna 110 to determine the distance to the network device. Thus, in this embodiment, the antenna unit cells 100 in the outer ring 150 are not used by the HADM algorithm to determine the distance to the network device.

In some other embodiments the two signals from the central antenna 110 are used separately by the HADM calculation. In another embodiments, only one of the polarization signals from the central antenna 110 is used by the HADM algorithm.

Optionally, as shown in Box 405, prior to performing the distance measurement, the incoming signal direction data acquired during the previous AoX phase, can be used here to determine the antenna phase pattern variations and compensate it during the HADM calculations to improve the distance measurement accuracy. In more detail, antennas with perfectly isotropic radiation patterns may not exist. A real HADM antenna, even if it is designed to have balanced phase pattern, like the central antenna 110 used in the rotational symmetric arrays, may have some residual spatial phase pattern variations. These variations may cause spatial dependent HADM distance measurement errors. If the direction of the incoming signal is known, the phase pattern of the HADM antenna to that direction can be acquired from a stored 3D phase pattern look up table (which may be created during a calibration process) and the HADM measurement error can be compensated. In this way, the HADM antenna imperfections/unbalances can be compensated using data obtained during the AoX algorithm.

Finally, as shown in Box 420, the processing unit 20 calculates the spatial position of the network device using its own known position, the angle of arrival or departure calculated in Box 400, and the distance calculated in Box 410.

It is noted that Boxes 400 and 410 may be performed in the opposite order. However, it may be advantageous to perform the direction computation first, because that result may be used to compensate for phase variations in the antenna.

Figure 5:
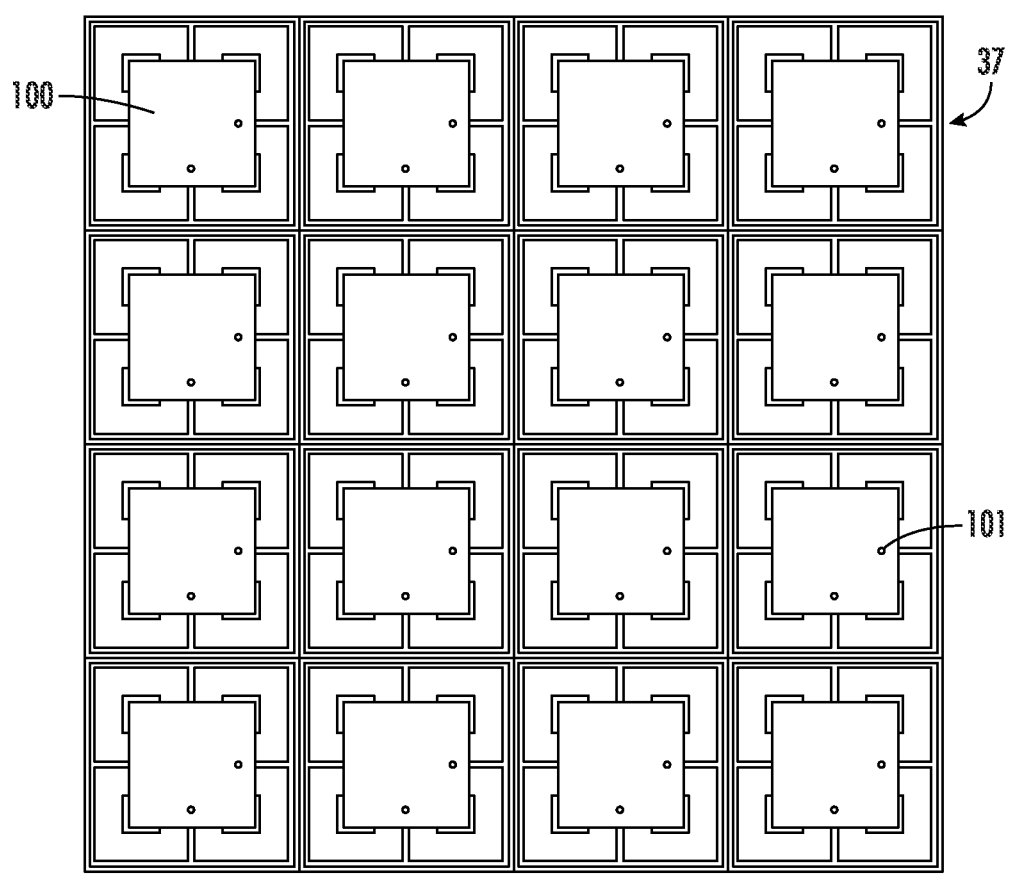
FIG. 5 shows the antenna array according to another embodiment.

FIG. 5 shows a second embodiment of an antenna array 37. In this embodiment, the antenna array 37 is arranged as a traditional two dimensional array, having N rows and M columns. In certain embodiments, the number of rows and the number of columns are equal. In this embodiment, the antenna unit cells 100 may be the same as those described above, having a patch antenna on the top surface, a ground layer beneath the top surface and optionally a RIS layer disposed between the top surface and the ground layer.

In certain embodiments, the two signal vias 101 from each of the antenna unit cells 100 are in communication with the multiplexer 36 so that both polarized signals from each antenna unit cell may be provided as the input to the radio circuit 31. In addition, the two signal vias from at least one of the antenna unit cells 100 is provided to the 90° hybrid 38, to create a circularly polarized signal. The antenna that is used to provide the circularly polarized signal may be an interior antenna unit cell, that is surrounded on all sides (i.e. the 4 sides on the surface of the printed circuit board) by another antenna unit cell 100. In FIG. 5, there are four interior antennas that may be utilized. These four interior antenna unit cells may have the most symmetric radiation patterns within the antenna array 37. The antenna unit cell that is used to create the circular polarized signal may be referred to as a dual purpose antenna, as it is used for both the AoX algorithm and the distance measurement. Of course, antenna arrays of different configurations have a different number of interior antennas. For example, if the antenna array is configured as N rows and M columns, where N and M are three or more, the number in interior antenna elements is given by (N−2)×(M−2).

Figure 6:
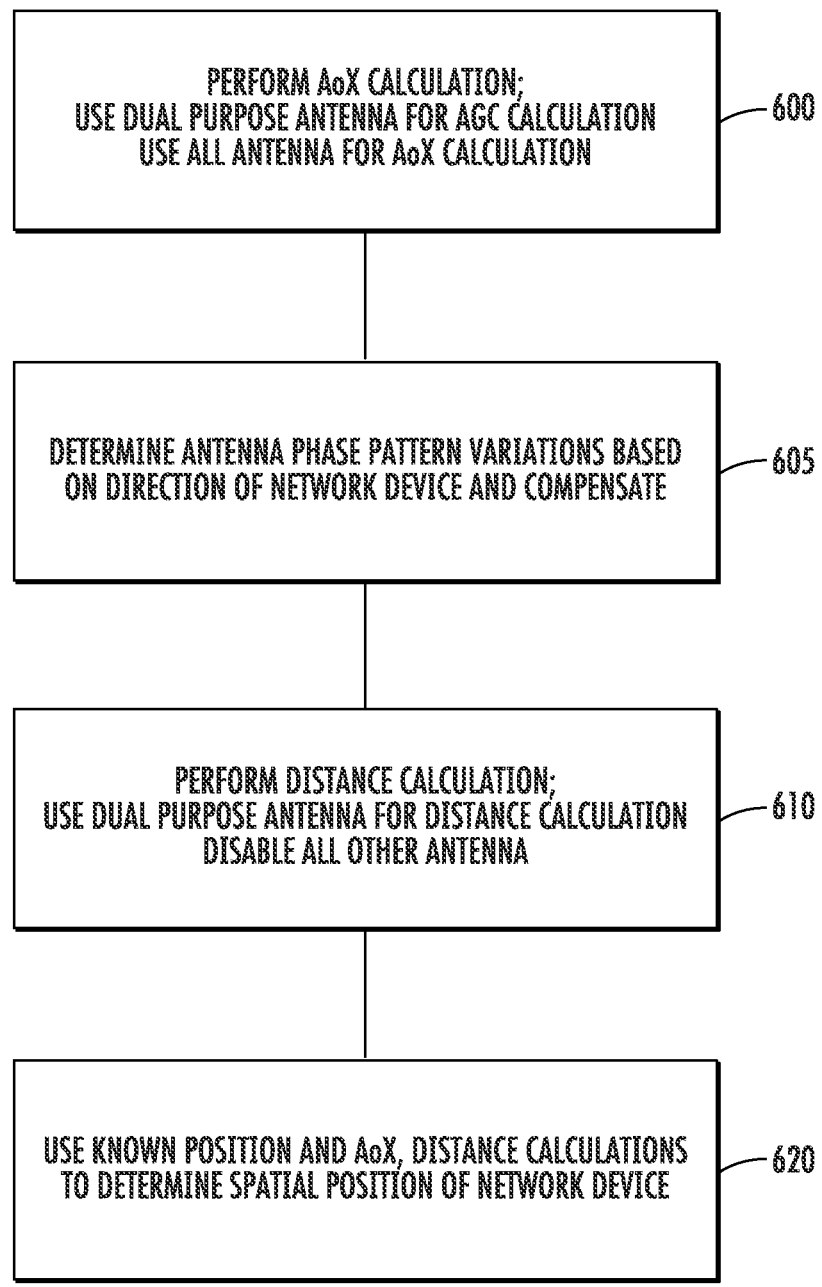
FIG. 6 shows a flow chart for calculating the spatial position of a network device using the antenna array of FIG. 5.

FIG. 6 shows a flowchart that may be used to determine the spatial position of a network device using the antenna array of FIG. 5. First, as shown in Box 600, the locator device 10 is configured to perform the AoX algorithm. In this mode, the locator device 10 may utilize the dual purpose antenna, in circular polarization mode, to set the automatic gain control (AGC) of the radio circuit 31. For example, the locator device 10 may utilize the dual purpose antenna during the guard period 341 and the reference period 342 to set the AGC. During the actual transmission of the packet containing the CTE, the processing unit 20 switches the multiplexer 36 so that samples are collected from each of the antenna unit cells 100 within the antenna array, including the dual purpose antenna. In certain embodiments, the processing unit switches the multiplexer 36 so that samples are collected for both polarizations of each antenna unit cell 100 in the antenna array 37. Note that the antenna unit cells 100 are used for both AoA and AoD calculations.

Next, as shown in Box 610, the distance measurement is made. This may be done by selecting the circular polarization signal from the dual purpose antenna and using the signal received and transmitted from that dual purpose antenna as input to the HADM algorithm to determine the distance to the network device. Thus, in this embodiment, the rest of the antenna unit cells 100 in the antenna array 37 are not used to determine the distance to the network device.

Optionally, as shown in Box 605, prior to performing the distance measurement, the incoming signal direction data acquired during the previous AoX phase can be used here to determine the antenna phase pattern variations and compensate it during the HADM calculations to improve the distance measurement accuracy.

Finally, as shown in Box 620, the processing unit 20 calculates the spatial position of the network device using its own known position, the angle of arrival or departure calculated in Box 600, and the distance calculated in Box 610.

It is noted that Boxes 600 and 610 may be performed in the opposite order. However, it may be advantageous to perform the direction computation first, because that result may be used to compensate for phase variations in the antenna.

The present system and method has many advantages. First, this system allows the computation of a network device's spatial position using only one locator device. This simplifies the infrastructure needed for spatial position measuring and reduces installation and maintenance cost significantly. Specifically, the installation is far simpler as no calibration of the multiple locator positions relative to each other is required. Further, the computation power needed is reduced, as only one locator device is needed. Further, with combined AoX and HADM operation, the direction information of the incoming signal can be used to compensate for the antenna pattern unbalances and thus, the accuracy of the HADM distance measurement can be improved.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of determining a spatial position of a network device, using a locator device having a known position, wherein the locator device comprises an antenna array, the method comprising:
   calculating a direction from the locator device to the network device using an Angle of Arrival or Angle of Departure (AoX) algorithm, wherein signals from a plurality of antenna elements in the antenna array are used as inputs to the AoX algorithm;
   calculating a distance from the locator device to the network device using a High Accuracy Distance Measurement (HADM) algorithm, wherein signals from only one antenna element in the antenna array are used as inputs by the HADM algorithm, wherein the only one antenna element generates two polarization signals which are combined to form a circularly polarized signal and the circularly polarized signal is used to set a gain of a receive circuit in the locator device before the AoX algorithm is executed; and
   determining the spatial position of the network device using the known position, the direction and the distance.

2. The method of claim 1, wherein each antenna element in the antenna array generates two polarization signals, and wherein calculating the direction comprises: using at least one of the two polarization signals from each antenna element in the plurality of antenna elements as the inputs to the AoX algorithm.

3. The method of claim 1, wherein the circularly polarized signal is used as an input by the HADM algorithm.

4. The method of claim 1, wherein the signals from the only one antenna element are not used as inputs by the AoX algorithm.

5. The method of claim 1, wherein the antenna array comprises a plurality ($N_a$) of antenna unit cells arranged in an outer ring, each antenna unit cell offset from an adjacent antenna unit cell by an angle equal to $360°/N_a$, wherein each antenna unit cell comprises:
   a top surface, comprising a patch antenna and a ground guard ring surrounding the patch antenna; and
   a ground layer disposed beneath the top surface; and
   a central antenna disposed inside the outer ring.

6. The method of claim 5, wherein the plurality of antenna unit cells in the outer ring comprise the plurality of antenna elements used by the AoX algorithm.

7. The method of claim 5, wherein signals from only the central antenna are used by the HADM algorithm.

8. The method of claim 7, wherein the central antenna generates the two polarization signals which are combined to form the circularly polarized signal and the circularly polarized signal from the central antenna is used as an input by the HADM algorithm.

9. The method of claim 1, wherein the antenna array comprises a plurality of antenna unit cells arranged in a two dimensional array; wherein signals from all antenna unit cells in the plurality of antenna unit cells are used as inputs by the AoX algorithm.

10. The method of claim 9, wherein one or more of the plurality of antenna unit cells are surrounded by adjacent antenna unit cells on all sides and are referred to as interior antenna unit cells; and wherein signals from one of the interior antenna unit cells are used as inputs by the HADM algorithm.

11. The method of claim 1, further comprising using the direction to compensate for phase variation in the only one antenna element in the antenna array prior to performing the HADM algorithm.

12. A locator device for determining a spatial position of a network device, wherein the locator device has a known position, comprising:
   an antenna array, comprising a plurality of antenna elements, each generating one or more signals;
   a multiplexer in communication with the one or more signals from the plurality of antenna elements;
   a radio circuit to receive an output from the multiplexer;
   a processing unit;
   a memory device in communication with the processing unit, comprising instructions, which when executed by the processing unit, enable the locator device to:
   calculate a direction from the locator device to the network device using an Angle of Arrival or Angle of Departure (AoX) algorithm, wherein signals from a plurality of antenna elements in the antenna array are used to provide inputs to the AoX algorithm;
   calculate a distance from the locator device to the network device using a High Accuracy Distance Measurement (HADM) algorithm, wherein signals from only one antenna element in the antenna array are used by the HADM algorithm, wherein the only one antenna element generates two polarization signals which are combined to form a circularly polarized signal and the circularly polarized signal is used to set a gain of the radio circuit before the AoX algorithm is executed; and
determine the spatial position of the network device using the known position, the direction and the distance.

13. The locator device of claim 12, wherein the antenna array comprises a plurality ($N_a$) of antenna unit cells arranged in an outer ring, each antenna unit cell offset from an adjacent antenna unit cell by an angle equal to $360°/N_a$, wherein each antenna unit cell comprises:
 a top surface, comprising a patch antenna and a ground guard ring surrounding the patch antenna, the patch antenna having one or more vias to generate the one or more signals; and
 a ground layer disposed beneath the top surface; and
 a central antenna disposed inside the outer ring, having one or more vias to generate the one or more signals.

14. The locator device of claim 13, wherein the plurality of antenna unit cells in the outer ring comprise the plurality of antenna elements used by the AoX algorithm.

15. The locator device of claim 13, wherein signals from only the central antenna are used by the HADM algorithm.

16. The locator device of claim 15, further comprising a 90° hybrid, wherein the central antenna generates the two polarization signals which are combined by the 90° hybrid to form the circularly polarized signal; and the circularly polarized signal from the central antenna is used by the HADM algorithm.

17. The locator device of claim 12, wherein the antenna array comprises a plurality of antenna unit cells arranged in a two dimensional array; wherein signals from all antenna unit cells in the plurality of antenna unit cells are used as inputs by the AoX algorithm.

18. The locator device of claim 17, wherein one or more of the plurality of antenna unit cells are surrounded by adjacent antenna unit cells on all sides and are referred to as interior antenna unit cells; and wherein signals from one of the interior antenna unit cells are used as inputs by the HADM algorithm.

19. The locator device of claim 18, further comprising a 90° hybrid, wherein the one of the interior antenna unit cells generates the two polarization signals which are combined by the 90° hybrid to form the circularly polarized signal and the circularly polarized signal is used by the HADM algorithm.

* * * * *